(12) United States Patent
Sun

(10) Patent No.: US 12,371,080 B2
(45) Date of Patent: Jul. 29, 2025

(54) TRAIN POSITIONING METHOD AND APPARATUS, SYSTEM, AND COMPUTER-READABLE MEDIUM

(71) Applicant: Siemens Mobility GmbH, Munich (DE)

(72) Inventor: Jin Long Sun, Beijing (CN)

(73) Assignee: Siemens Mobility GmbH, Munich (DE)

( * ) Notice: Subject to any disclaimer, the term of this patent is extended or adjusted under 35 U.S.C. 154(b) by 794 days.

(21) Appl. No.: 17/764,272

(22) PCT Filed: Sep. 25, 2020

(86) PCT No.: PCT/CN2020/117903
§ 371 (c)(1),
(2) Date: Mar. 28, 2022

(87) PCT Pub. No.: WO2021/057927
PCT Pub. Date: Apr. 1, 2021

(65) Prior Publication Data
US 2022/0402534 A1   Dec. 22, 2022

(30) Foreign Application Priority Data
Sep. 26, 2019  (CN) .......................... 201910922693.2

(51) Int. Cl.
*B61L 25/02* (2006.01)
*B61L 25/04* (2006.01)
(Continued)

(52) U.S. Cl.
CPC ............. *B61L 25/025* (2013.01); *B61L 25/04* (2013.01); *H01Q 1/3208* (2013.01);
(Continued)

(58) Field of Classification Search
CPC ........ B61L 25/025; B61L 25/04; H04W 4/42; H04W 4/029; H04W 52/0274; H01Q 1/3208
See application file for complete search history.

(56) References Cited

U.S. PATENT DOCUMENTS 9,227,642 B2 *   1/2016   Huntimer .............. B61L 25/025
10,297,153 B2 *  5/2019   Gao .................. G08G 1/096833
(Continued)

FOREIGN PATENT DOCUMENTS

| | | |
|---|---|---|
| CN | 104354726 A | 2/2015 |
| CN | 104442928 A | 3/2015 |

(Continued)

OTHER PUBLICATIONS

Meng, Li et al; "Key Technology of Vehicle in Fully Automatic Operation System"; Aug. 28, 2018; China Academic Journal Electronic Publishing House; http://www.cnki.net.

*Primary Examiner* — Jason C Smith
(74) *Attorney, Agent, or Firm* — Laurence A. Greenberg; Werner H. Stemer; Ralph E. Locher

(57) ABSTRACT

A train positioning method includes acquiring first device identification information at an antenna; acquiring train positioning information; after determining the first device identification information is trustworthy, storing the first device identification information and the positioning information in a non-volatile memory; after awakening the train from dormancy mode, receiving second device identification information using the antenna; according to the received second device identification information and the first device identification information from the memory, determining whether, after being awakened, the train is at the same position as before entering dormancy mode; upon determining that, after awakening, the train is at the same position as before entering dormancy mode, determining the current (Continued)

position and direction of the train match positioning information in the memory, and completing positioning of the train. This ensures the usage experience of users of a train. An apparatus, a system, and a computer-readable medium are also provided.

15 Claims, 13 Drawing Sheets

(51) Int. Cl.
    *H01Q 1/32*     (2006.01)
    *H04W 4/029*     (2018.01)
    *H04W 4/42*     (2018.01)
    *H04W 52/02*     (2009.01)

(52) U.S. Cl.
    CPC ............. *H04W 4/029* (2018.02); *H04W 4/42* (2018.02); *H04W 52/0274* (2013.01)

(56) References Cited

U.S. PATENT DOCUMENTS

| | | | |
|---|---|---|---|
| 11,866,075 B2 * | 1/2024 | Hammerl | B61L 25/021 |
| 2009/0040102 A1 | 2/2009 | Medina Herrero et al. | |
| 2010/0303070 A1 * | 12/2010 | Shigeeda | H04L 67/12 |
| | | | 370/389 |
| 2013/0021145 A1 * | 1/2013 | Boudy | G08B 13/1427 |
| | | | 340/572.1 |
| 2015/0199806 A1 * | 7/2015 | Tseng | G06T 7/70 |
| | | | 382/104 |
| 2022/0402534 A1 * | 12/2022 | Sun | H01Q 1/3208 |
| 2023/0127674 A1 * | 4/2023 | Hammerl | B61L 27/70 |
| | | | 246/122 R |

FOREIGN PATENT DOCUMENTS

| | | | | | |
|---|---|---|---|---|---|
| CN | 106314485 A | * | 1/2017 | ............. | B61L 25/02 |
| CN | 107672627 A | | 2/2018 | | |
| CN | 107697105 A | * | 2/2018 | ............. | B61L 25/02 |
| CN | 108263447 A | | 7/2018 | | |
| CN | 109063855 A | * | 12/2018 | | |
| CN | 109204385 A | | 1/2019 | | |
| CN | 109398421 A | | 3/2019 | | |
| CN | 109677453 A | | 4/2019 | | |
| CN | 110015322 A | | 7/2019 | | |
| CN | 113815683 A | * | 12/2021 | ........... | B61L 25/026 |
| CN | 114228788 B | * | 9/2023 | | |
| DE | 102020204195 A1 | | 9/2021 | | |
| EP | 3473522 A1 | * | 4/2019 | ......... | B61L 15/0027 |
| ES | 2497840 T3 | * | 9/2014 | ......... | B61L 15/0036 |
| JP | 6189089 B2 | * | 8/2017 | | |
| TW | 201528220 A | * | 7/2015 | ............. | G06T 7/70 |
| TW | 201531996 A | * | 8/2015 | | |
| WO | WO-2009125470 A1 | * | 10/2009 | ......... | H04L 12/4625 |

* cited by examiner

TRAIN POSITIONING METHOD AND APPARATUS, SYSTEM, AND COMPUTER-READABLE MEDIUM

FIELD AND BACKGROUND OF THE INVENTION

The present invention relates to the technical field of railway transportation, and in particular to a train positioning method, apparatus and system and a computer-readable medium.

Fully automatic operation (FAO) is a train operation mode in which the operation of a train is completely controlled by an automatic control system, for train functions such as automatic starting, automatic running, stopping at stations as scheduled, fully automatic operation, automatic returning, automatic going to and from the depot, etc. It is widely used in train control in railway transportation such as urban subways, high-speed railways, etc. FAO can be achieved only based on train positioning, i.e., train positioning before a train starts and during the operation of a train, before the automatic control system can automatically control the train according to its position.

An FAO train will enter a dormancy area when it needs maintenance or its operation is suspended, and the train will enter the dormancy mode in the dormancy area. In order to ensure FAO can be implemented on the train immediately after it is woken up, the train needs to be positioned after being woken up, i.e., the position of the train needs to be obtained after it is woken up.

At present, during the dormancy period, the core train-mounted equipment is normally powered, and the equipment will store the positioning information before dormancy of the train, monitor the movement of the train during the dormancy period, and update the stored positioning information based on its movement, thereby the latest positioning information can be obtained from the core train-mounted equipment after the train is woken up and the obtained positioning information can be used for FAO of the train.

As for existing positioning methods after a train is woken up, since the core train-mounted equipment needs to be powered normally during the dormancy period, it is necessary to provide a storage battery on the train to supply power to the core train-mounted equipment; in order to ensure non-interrupted power supply to the core train-mounted equipment during a long time of dormancy, the storage battery provided on the train should have a high capacity, but its volume and weight will also increase as the capacity increases. A heavy storage battery will increase the weight of the train, and a large storage battery will reduce the space available on the train, both impacting user experience.

SUMMARY OF THE INVENTION

In view of this, the train positioning method, apparatus and system and the computer-readable medium provided by the present invention can ensure the use experience of train users.

In the first aspect, the embodiments of the present invention provide a train positioning method, comprising:
  after a train stops in a dormancy area, obtaining first device identification information received by at least one first receiving antenna, wherein, at least one receiving antenna is provided on the train, at least one positioning device is provided in the dormancy area, the positioning device is used to send device identification information to the receiving antenna located within an effective communication range, different positioning devices send different device identification information, the first receiving antenna is a receiving antenna that receives the identification information before the train enters a dormancy mode, and the first device identification information is the device identification information received by the first receiving antenna;
  obtaining positioning information of the train, wherein, the positioning information comprises position information and direction information, the position information is used to indicate the position of the train, and the direction information is used to indicate the directions of two ends of the train relative to the dormancy area;
  after deciding that the first device identification information is credible, storing the first device identification information and the positioning information in a non-volatile memory, and putting the train into a dormancy mode;
  after the train is woken up from the dormancy mode, using the at least one receiving antenna to receive second device identification information;
  deciding whether the train is in the position before it enters the dormancy mode after being woken up based on the received second device identification information and the first device identification information read from the non-volatile memory;
  if it is decided that the train is in the position before it enters the dormancy mode after being woken up, deciding that the current position and direction of the train match the positioning information stored in the non-volatile memory, and ending positioning of the train.

In a first possible implementation, with reference to the first aspect above, deciding whether the train is in the position before it enters the dormancy mode after being woken up based on the received second device identification information and the first device identification information read from the non-volatile memory comprises:
  deciding whether there is at least one second receiving antenna that receives second device identification information, wherein, the second receiving antenna is a receiving antenna that receives the identification information after the train is woken up from the dormancy mode, and the second device identification information is the device identification information received by the second receiving antenna;
  if there is at least one second receiving antenna that receives the second device identification information, further deciding whether each piece of the second device identification information is identical with each piece of the first device identification information, and deciding whether the identical second identification information and first device identification information are received by the same receiving antenna;
  if each piece of the second device identification information is identical with each piece of the first device identification information, and the identical second identification information and the first device identification information are received by the same receiving antenna, deciding that the train is in the position before it enters the dormancy mode after being woken up;
  if each piece of the second device identification information is not identical with each piece of the first device identification information, or at least one piece of the second identification information and the identical first device identification information are received by different receiving antennas, deciding that the train is not in the position before it enters the dormancy mode after being woken up;

if there is no second receiving antenna that receives the second device identification information, deciding that the train is not in the position before it enters the dormancy mode after being woken up.

In a second possible implementation, with reference to the first possible implementation above, after deciding that the train is not in the position before it enters the dormancy mode after being woken up, it further comprises:

checking whether each of the receiving antennas provided on the train is in normal operation;

if each of the receiving antennas provided on the train is in normal operation, deleting the first device identification information and the positioning information stored in the non-volatile memory;

if at least one of the receiving antennas provided on the train is in abnormal operation, keeping the first device identification information and the positioning information stored in the non-volatile memory.

In a third possible implementation, with reference to the first aspect above, before storing the first device identification information and the positioning information in a non-volatile memory, it further comprises:

determining the deployment position information of each of the positioning devices sending the first device identification information;

deciding whether the first device identification information is credible based on the deployment position information and the positioning information;

if the first device identification information is credible, performing the step of storing the first device identification information and the positioning information in a non-volatile memory;

if the first device identification information is not credible, sending alarm information.

In a fourth possible implementation, with reference to the first aspect and any of the first possible implementation, the second possible implementation and the third possible implementation of the first aspect above, after obtaining first device identification information received by at least one first receiving antenna, it further comprises:

deciding whether there is at least one third receiving antenna that receives the device identification information sent by a positioning device matching it, wherein, the at least one receiving antenna provided on the train comprises at least one third receiving antenna, the third receiving antenna has a matching positioning device, and, when the train reaches a target stop position in the dormancy area, the third receiving antenna can receive the device identification information sent by the matching positioning device;

if there is at least one third receiving antenna that receives the device identification information sent by the positioning device matching it, deciding that the train has stopped in position, and performing the step of obtaining first device identification information received by at least one first receiving antenna;

if there is no third receiving antenna that receives the device identification information sent by the positioning device matching it, deciding that the train has not stopped in position.

In the second aspect, the embodiments of the present invention also provide a train positioning apparatus, comprising:

a first information obtaining module, used to, after a train stops in a dormancy area, obtain first device identification information received by at least one first receiving antenna, wherein, at least one receiving antenna is provided on the train, at least one positioning device is provided in the dormancy area, the positioning device is used to send device identification information to the receiving antenna located within an effective communication range, different positioning devices send different device identification information, the first receiving antenna is a receiving antenna that receives the identification information before the train enters the dormancy mode, and the first device identification information is the device identification information received by the first receiving antenna;

a second information obtaining module, used to obtain positioning information of the train, wherein, the positioning information comprises position information and direction information, the position information is used to indicate the position of the train, and the direction information is used to indicate the directions of two ends of the train relative to the dormancy area;

an information storage module, used to, after deciding that the first device identification information obtained by the first information obtaining module is credible, store the first device identification information and the positioning information obtained by the second information obtaining module in a non-volatile memory, and put the train into a dormancy mode;

a third information obtaining module, used to, after the train is woken up from the dormancy mode, use the at least one receiving antenna to receive second device identification information;

a movement deciding module, used to decide whether the train is in the position before it enters the dormancy mode after being woken up based on the second device identification information received by the third information obtaining module and the first device identification information stored by the information storage module in the non-volatile memory;

a train positioning module, used to, when the movement deciding module decides that the train is in the position before it enters the dormancy mode after being woken up, decide that the current position and direction of the train match the positioning information stored by the information storage module in the non-volatile memory, and end positioning of the train.

In a first possible implementation, with reference to the second aspect above, the movement deciding module comprises:

a first deciding unit, used to decide whether there is at least one second receiving antenna that receives second device identification information, wherein, the second receiving antenna is a receiving antenna that receives the identification information after the train is woken up from the dormancy mode, and the second device identification information is the device identification information received by the second receiving antenna;

a second deciding unit, used to, when the first deciding unit decides that there is at least one second receiving antenna that receives second device identification information, further decide whether each piece of the second device identification information is identical with each piece of the first device identification information, and decide whether the identical second identification information and first device identification information are received by the same receiving antenna;

a first identification unit, used to, when the second deciding unit decides that each piece of the second device identification information is identical with each piece of the first device identification information, and the identical second identification information and first device identification information are received by the same receiving antenna, decide that the train is in the position before it enters the dormancy mode after being woken up; and, when the second deciding unit decides that each piece of the second device identification information is not identical with each piece of the first device identification information, or at least one piece of the second identification information and the identical first device identification information are received by different receiving antennas, decide that the train is not in the position before it enters the dormancy mode after being woken up;

a second identification unit, used to, when the first deciding unit decides that there is no second receiving antenna that receives the second device identification information, decide that the train is not in the position before it enters the dormancy mode after being woken up.

In a second possible implementation, with reference to the first possible implementation above, the train positioning apparatus further comprises:

an antenna checking module, used to check whether each of the receiving antennas provided on the train is in normal operation when the first identification unit or the second identification unit decides that the train is not in the position before it enters the dormancy mode after being woken up;

an information management module, used to, when the antenna checking module decides that each of the receiving antennas provided on the train is in normal operation, delete the first device identification information and the positioning information stored in the non-volatile memory, and, when the antenna checking module decides that at least one of the receiving antennas provided on the train is in abnormal operation, keep the first device identification information and the positioning information stored in the non-volatile memory.

In a third possible implementation, with reference to the second aspect above, the train positioning apparatus further comprises:

a position identification module, used to determine the deployment position information of each of the positioning devices sending the first device identification information based on the first device identification information obtained by the first information obtaining module;

an information checking module, used to decide whether the first device identification information is credible based on the deployment position information determined by the position identification module and the positioning information obtained by the second information obtaining module, trigger the information storage module to perform the step of storing the first device identification and the positioning information in a non-volatile memory when it is decided that the first device identification information is credible, and send alarm information when it is decided that the first device identification information is not credible.

In a fourth possible implementation, with reference to the second aspect and any of the first possible implementation, the second possible implementation and the third possible implementation of the second aspect above, the train positioning apparatus further comprises:

a train parking checking module, used to decide whether there is at least one third receiving antenna that receives the device identification information sent by a positioning device matching it, wherein, the at least one receiving antenna provided on the train comprises at least one third receiving antenna, the third receiving antenna has a matching positioning device, when the train reaches a target stop position in the dormancy area, the third receiving antenna can receive the device identification information sent by the matching positioning device, decide that the train has stopped in position and trigger the first information obtaining module to perform the step of obtaining first device identification information received by at least one first receiving antenna when it is decided that there is at least one third receiving antenna that receives the device identification information sent by the positioning device matching it, and decide that the train has not stopped in position when it is decided that there is no third receiving antenna that receives the device identification information sent by the positioning device matching it.

In a third aspect, the embodiments of the present invention also provide another train positioning apparatus, comprising: at least one memory and at least one processor;

the at least one memory is used to store a machine-readable program; and the at least one processor is used to call the machine-readable program to execute the method provided by the first aspect and any of the possible implementations of the first aspect above.

In a fourth aspect, the embodiments of the present invention also provide a train positioning system, comprising: at least one receiving antenna, at least one positioning device and any of the train positioning apparatuses provided by the second aspect, any of the possible implementations of the second aspect and the third aspect;

the at least one receiving antenna is provided on a train;

the at least one positioning device is provided in a dormancy area;

the positioning device is used to send device identification information to the receiving antenna located within an effective communication range, wherein, different positioning devices send different device identification information;

the receiving antenna is used to receive the device identification information from the positioning device, and send the device identification information to the train positioning apparatus.

In a first possible implementation, with reference to the fourth aspect above, at least two receiving antennas are provided on the train along the running direction of the train.

In a second possible implementation, with reference to the fourth aspect or the first possible implementation of the fourth aspect above, at least two positioning devices are provided in the dormancy area along the track direction of the dormancy area.

In a fifth aspect, the present invention also provides a computer-readable medium, which stores a computer instruction that, when executed by a processor, causes the processor to perform the method provided by the first aspect and any of the possible implementations of the first aspect above.

From the above technical solution, it can be known that, when a train stops in a dormancy area, a positioning device provided in the dormancy area will send device identification information to a receiving antenna provided on the train, and different positioning devices will send different device identification information; the positioning information of the train is obtained before the train enters the dormancy mode, and the obtained positioning information and first device identification information received by the receiving antenna are stored in a non-volatile memory; after that, the train enters the dormancy mode, and, when it is woken up, each of the receiving antennas provided on the train is used to receive second device information, the first device identification information is read from the non-volatile memory; after that, the second device identification information received and the first device identification information read are used to decide whether the train is in the position before it enters the dormancy mode after being woken up; if it is decided that the train is in the position before it enters the dormancy mode after being woken up, the positioning information stored in the non-volatile memory may be used as the result of train positioning, and positioning of the train after being woken up is ended. It can be seen from this that, a positioning device provided in the dormancy area can send device identification information to a receiving antenna provided on the train, the positioning information of the train before the train enters the dormancy mode and the first device identification information received by the receiving antenna are stored in a non-volatile memory; after that, the train can be disconnected from the power supply to enter the dormancy mode, and, when it is woken up, the first device identification information can be read from the non-volatile memory, the receiving antenna is used again to receive second device identification information, and the first device identification information and the second device identification information are used to decide whether the train is in the position before it enters the dormancy mode after being woken up; if it is decided that the train is in the position before it enters the dormancy mode after being woken up, the positioning information stored in the non-volatile memory may continue to be used, thereby completing positioning of a train after it is woken up. Since the train may be completely disconnected from the power supply to enter the dormancy mode, it is unnecessary to provide a large and heavy battery on the train while positioning of the train is performed after the train is woken up, and therefore the train weight will not be increased and the available space on the train will not be reduced, thus ensuring user experience.

REFERENCE NUMERALS IN THE DRAWINGS

Figure 1A:
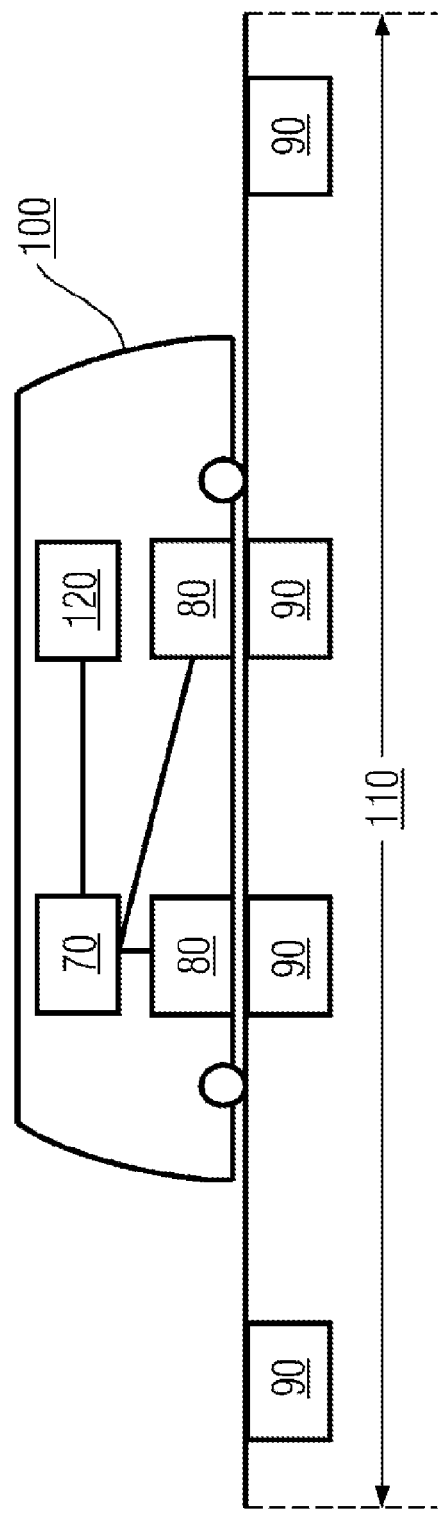
FIG. 1A is a schematic diagram of a train positioning system provided by one embodiment of the present invention.

101: obtaining first device identification information received by at least one first receiving antenna, after a train stops in a dormancy area
102: obtaining positioning information of the train
103: storing the first device identification information and the positioning information in a non-volatile memory
104: after the train is woken up from the dormancy mode, using each of the receiving antennas to receive second device identification information
105: deciding whether the train is in the position before it enters the dormancy mode based on the first and the second device identification information
106: deciding that the current position and direction of the train match the positioning information, and ending positioning of the train
201: after the train is woken up, using each of the receiving antennas provided on the train to receive device identification information
202: deciding whether each of the receiving antennas has received device identification information
203: deciding whether the device identification information received by each of the receiving antennas is identical with the first device identification information
204: deciding that the position of the train has not changed before and after dormancy
205: deciding that the position of the train has changed before and after dormancy
301: deciding whether there is at least one second receiving antenna that receives second device identification information
302: deciding whether the second device identification information is identical with the first device identification information, and deciding whether the identical first device identification information and second device identification information are received by the same receiving antenna
303: deciding that the train is in the position before it enters the dormancy mode after being woken up
304: deciding that the train is not in the position before it enters the dormancy mode after being woken up
401: checking whether each of the receiving antennas provided on the train is in normal operation 402: deleting the first device identification information and the positioning information stored in the non-volatile memory 403: keeping the first device identification information and the positioning information stored in the non-volatile memory 501: determining the deployment position information of each of the positioning devices sending the first device identification information 502: deciding whether the first device identification information is credible based on the deployment position information and the positioning information 503: sending alarm information 601: deciding whether there is a third receiving antenna that receives device identification information sent by a positioning device matching it 602: deciding that the train has stopped in position, and performing step 101

603: deciding that the train has not stopped in position

| | |
|---|---|
| 70: | train positioning apparatus |
| 80: | receiving antenna |
| 90: | positioning device |
| 100: | train |
| 110: | dormancy area |
| 120: | non-volatile memory |
| 701: | first information obtaining module |
| 702: | second information obtaining module |
| 703: | information storage module |
| 704: | third information obtaining module |
| 705: | movement deciding module |
| 706: | train positioning module |
| 707: | antenna checking module |
| 708: | information management module |
| 709: | position identification module |
| 710: | information checking module |
| 711: | train parking checking module |
| 712: | memory |
| 713: | processor |
| 7051: | first deciding unit |
| 7052: | second deciding unit |
| 7053: | first identification unit |
| 7054: | second identification unit |

DETAILED DESCRIPTION OF THE INVENTION

As mentioned above, in order to ensure that accurate positioning information can be obtained after a train is woken up, the core train-mounted equipment is used to store the positioning information before the train enters the dormancy mode, and the core train-mounted equipment is normally powered during the dormancy period of the train, so that the core train-mounted equipment can monitor movement of the train during the dormancy period and update the stored positioning information based on the movement monitored, thereby the latest positioning information can be obtained from the core train-mounted equipment after the train is woken up. Since the core train-mounted equipment is always monitoring movement of the train during the dormancy period, in order to ensure normal power supply to the core train-mounted equipment during dormancy of the train, it is necessary to provide a large and heavy battery on the train, which will increase the train weight and reduce the available space on the train, resulting in poor user experience.

In the embodiments of the present invention, when a train enters a dormancy area, a positioning device provided in the dormancy area will send device identification information to a receiving antenna provided on the train, and then the positioning information before the train enters the dormancy mode and the device identification information received by the receiving antenna are stored in a non-volatile memory, before the train enters the dormancy mode. When the train is woken up from the dormancy mode, the stored device identification information can be read from the non-volatile memory, and thus it can be decided whether the train is in the position before it enters the dormancy mode after being woken up based on the read device identification information. If it is decided that the train is in the position before it enters the dormancy mode after being woken up, the positioning information stored in the non-volatile memory will continue to be used, and positioning of the train is ended. It can be seen that, since it can be decided whether the train is in the position before it enters the dormancy mode after being woken up based on device identification information, and, when it is decided that the train is in the position before it enters the dormancy mode after being woken up, the positioning information stored in the non-volatile memory continues to be used, and positioning of the train is ended, the train may be completely disconnected from the power supply during the dormancy period, it is unnecessary to provide a large and heavy battery on the train, and therefore the train weight will not be increased and the available space on the train will not be reduced, thus ensuring user experience.

As shown in FIG. 1A, one embodiment of the present invention provides a train positioning system, which may comprise: at least one receiving antenna 80, at least one positioning device 90 and a train positioning apparatus 70;

each receiving antenna 80 is provided on a train 100;

each positioning device 90 is provided in a dormancy area 110;

the positioning device 90 is used to send device identification information to the receiving antenna 80 located within an effective communication range, wherein, different positioning devices send different device identification information;

the receiving antenna 80 is used to receive the device identification information from the positioning device 90, and send the device identification information to the train positioning apparatus 70;

the train positioning apparatus 70 is used to store the positioning information before the train 100 enters the dormancy mode and the first device identification information received by the receiving antenna 80 in a non-volatile memory 120; after that, the train is put in the dormancy mode, and, when the train 100 is woken up from the dormancy mode, the train positioning apparatus 70 again obtains second device identification information received by the receiving antenna 80 after the train 100 is woken up; after that, the train positioning apparatus 70 decides whether the train 100 is in the position before it enters the dormancy mode after being woken up based on the obtained second device identification information and the first device identification information stored in the non-volatile memory 120; if it is decided that the train 100 is in the position before it enters the dormancy mode after being woken up, the train positioning apparatus 70 takes the positioning information stored in the non-volatile memory 120 as the positioning information indicating the current position of the train 100.

In the embodiments of the present invention, the receiving antenna 80 provided on the train 100 can obtain the first device identification information and the second device identification information respectively before the train 100 enters the dormancy mode and after it is woken up from the dormancy mode; the train positioning apparatus 70 can store the positioning information before the train 100 enters the dormancy mode and the first device identification information in the non-volatile memory 120; after that, the train 100 can enter the dormancy mode with power disconnected, and, when the train 100 is woken up from the dormancy mode, the train positioning apparatus 70 can obtain the second device identification information from the receiving antenna 80 and read the first device identification information from the non-volatile memory 120, and it can be decided whether the train 100 is in the position before it enters the dormancy mode after being woken up based on a comparison between the first device identification information and the second device identification information; when it is decided that the train 100 is in the position before it enters the dormancy mode after being woken up, the train positioning apparatus 70 takes the positioning information stored in the non-volatile memory 120 as the positioning information indicating the current position of the train 100. It can be seen that, it can be decided whether the position of the train 100 has changed before it enters the dormancy mode and after it is woken up from the dormancy mode based on device identification information, and, if the train 100 is in the position before it enters the dormancy mode after being woken up, the positioning information before the train 100 enters the dormancy mode can continue to be used for completing positioning of the train 100, and therefore the train 100 can be completely disconnected from the power supply during the dormancy period, and it is unnecessary to provide a large and heavy battery on the train 100, and therefore the weight of the train 100 will not be increased and the available space on the train will not be reduced, thus ensuring user experience.

In the embodiments of the present invention, a non-volatile memory 120 connected to the train positioning apparatus 70 is provided on the train 100. Before the train 100 enters the dormancy mode, the train positioning apparatus 70 can store the positioning information of the train 100 and the first device identification information received by the receiving antenna 80 in the non-volatile memory 120. After the train 100 is woken up from the dormancy mode, the train positioning apparatus 70 can read the first device information and the positioning information from the non-volatile memory 120.

In the embodiments of the present invention, different positioning devices 90 will send different device identification information, and therefore device identification information can be used to identify a positioning device 90. Specifically, the device identification information may be the identity information of a corresponding positioning device. For example, the device identification information may be the ID of the corresponding positioning device.

Optionally, based on the train positioning system shown in FIG. 1A, at least two receiving antennas 80 are provided on the train 100 along the running direction of the train 100.

In the embodiments of the present invention, a plurality of receiving antennas are provided on the train along the running direction of the train, each receiving antenna can receive device identification information from a positioning device separately, and thus device identification information received by a plurality of receiving antennas can be used to decide whether the position of the train has changed before and after dormancy of the train, thereby ensuring positioning accuracy of the train after it is woken up. In addition, it can be decided whether the position of the train has changed before and after dormancy as long as one receiving antenna can receive device identification information from a positioning device, and therefore it is only necessary to ensure one receiving antenna can receive device identification information from a positioning device when a train stops in the dormancy area, thereby lowering the requirements on the accuracy of the position of train parking.

In the embodiments of the present invention, when a plurality of receiving antennas are provided on the train, several optional plans can be used for the positions of the receiving antennas. For example, one receiving antenna may be provided at the train head and another at the train tail, or two receiving antennas may be provided at the train head and another two at the train tail, or at least three receiving antennas may be provided evenly on the train along the running direction of the train.

In the embodiments of the present invention, in order to ensure a receiving antenna can receive device identification information from a positioning device more effectively, the receiving antenna may be disposed on the bottom of the train. In addition, when the train stops at the target stop position in the dormancy area, at least one receiving antenna on the train aligns vertically with a positioning device in the dormancy area.

In the embodiments of the present invention, the receiving antenna 80 is a device capable of point-to-point wireless communication with the positioning device 90. For example, the receiving antenna 80 may be a transponder or a beacon antenna.

Optionally, based on the train positioning system shown in FIG. 1A, at least two positioning devices 90 are provided in the dormancy area 110 along the track direction of the dormancy area 110.

In the embodiments of the present invention, a plurality of positioning devices are provided in the dormancy area along the track direction of the dormancy area, and each positioning device can send device identification information to a receiving antenna separately. For one thing, each positioning device can send device identification information to one or more receiving antennas, so that the train positioning apparatus can decide whether the position of the train has changed before and after dormancy based on a plurality of pieces of device identification information, thus reducing the probability of erroneous decisions compared with the method for deciding it based on a single piece of device identification information; for another, because the positions of receiving antennas may differ on different trains and different trains may stop at different positions in the same dormancy area, a plurality of positioning devices in the dormancy area can meet the positioning requirement for various trains, thus ensuring the applicability of positioning of trains after being woken up based on positioning devices provided in the dormancy area.

In the embodiments of the present invention, in order to ensure device identification information sent by positioning devices can be received by receiving antennas, positioning devices may be provided beside the track in the dormancy area, and it can be ensured that positioning devices are aligned with receiving antennas vertically.

In the embodiments of the present invention, the positioning device 90 is a device capable of point-to-point communication with the receiving antenna 80. For example, the positioning device 90 may be a ground transponder or a beacon. Specifically, the positioning device 90 may be an active ground transponder or a passive ground transponder. When the positioning device 90 is an active ground transponder, the positioning device 90 may continuously send device identification information, or start to send device identification information after detecting that a train enters a specific area. When the positioning device 90 is a passive ground transponder, the positioning device 90 obtains induction energy when a train passes over the positioning device 90, and can send device positioning information based on the obtained induction.

In the embodiments of the present invention, the length of the dormancy area 110 is generally greater than the length of the train 100, so as to ensure that the train 100 can completely enter the dormancy area 110, which can be applied to trains 100 of different lengths.

In the embodiments of the present invention, the effective communication range of the positioning device 90 should avoid interference between parallel tracks. For example, if there are two parallel tracks A and B in the dormancy area, it should be ensured that the receiving antennas on a train will not receive device identification information sent by the positioning devices provided for track B when the train is on track A, and that the receiving antennas on a train will not receive device identification information sent by the positioning devices provided for track A when the train is on track B. For example, the effective communication range of a positioning device may be set as a sphere with the positioning device at the center and a radius of 2 m, i.e., the receiving antennas within 2 m from the positioning device can receive device identification information sent by the positioning device.

In the embodiments of the present invention, in order to facilitate the management and storage of device identification information, by configuring the receiving antennas, the same receiving antenna can only receive the device identification information sent by the same positioning device within a preset time period. Specifically, after receiving a piece of device identification information within a preset time period, only the device identification information sent by the positioning device that sent the piece of device identification information will be received within the preset period of time, or any other device identification information will not be received within the preset period of time.

The train positioning methods provided by the embodiments of the present invention are described below, and the methods may be executed by the aforementioned train positioning apparatus 70. Unless otherwise specified, the receiving antennas involved in these methods may be the aforementioned receiving antenna 80, the positioning devices involved in these methods may be the aforementioned positioning device 90, the trains involved in these methods may be the aforementioned train 100, the dormancy areas involved in these methods may be the aforementioned dormancy area 110, and the non-volatile memory involved in these methods may be the aforementioned non-volatile memory 120.

Figure 1B:
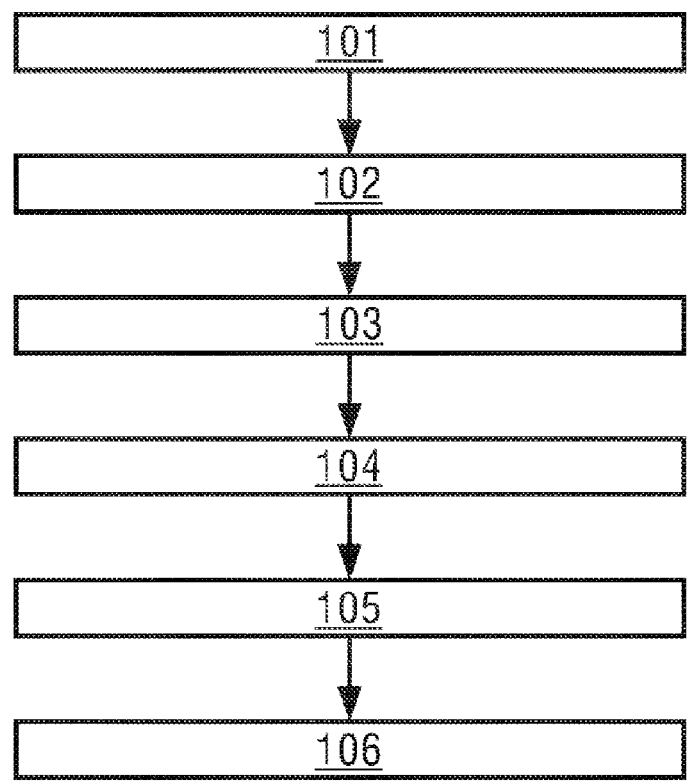
FIG. 1B is a flowchart of a train positioning method provided by one embodiment of the present invention.

As shown in FIG. 1B, the embodiments of the present invention provide a train positioning method, which may comprise the following steps:

Step 101: after a train stops in a dormancy area, obtaining first device identification information received by at least one first receiving antenna, wherein, at least one receiving antenna is provided on the train, at least one positioning device is provided in the dormancy area, the positioning device is used to send device identification information to the receiving antenna located within an effective communication range, different positioning devices send different device identification information, the first receiving antenna is a receiving antenna that receives the identification information before the train enters a dormancy mode, and the first device identification information is the device identification information received by the first receiving antenna;

Step 102: obtaining positioning information of the train, wherein, the positioning information comprises position information and direction information, the position information is used to indicate the position of the train, and the direction information is used to indicate the directions of two ends of the train relative to the dormancy area;

Step 103: after deciding that the first device identification information is credible, storing the first device identification information and the positioning information in a non-volatile memory, and putting the train into a dormancy mode;

Steps 104: after the train is woken up from the dormancy mode, using each of the receiving antennas to receive second device identification information;

Step 105: deciding whether the train is in the position before it enters the dormancy mode after being woken up based on the second device identification information received by each receiving antenna and the first device identification information read from the non-volatile memory;

Step 106: if it is decided that the train is in the position before it enters the dormancy mode after being woken up, deciding that the current position and direction of the train match the positioning information stored in the non-volatile memory, and ending positioning of the train.

In the embodiments of the present invention, when a train stops in a dormancy area, a positioning device provided in the dormancy area will send device identification information to a receiving antenna provided on the train, and different positioning devices will send different device identification information; the positioning information of the train is obtained before the train enters the dormancy mode, and the obtained positioning information and first device identification information received by the receiving antenna are stored in a non-volatile memory; after that, the train enters the dormancy mode, and, when it is woken up, second device information received again by the receiving antenna is obtained, and the first device identification information is read from the non-volatile memory; after that, the first device identification information read and the second device identification information received are used to decide whether the train is in the position before it enters the dormancy mode after being woken up; if it is decided that the train is in the position before it enters the dormancy mode after being woken up, the positioning information stored in the non-volatile memory may be used as the result of train positioning, and positioning of the train after being woken up is ended. It can be seen from this that, a positioning device provided in the dormancy area can send device identification information to a receiving antenna provided on the train, the positioning information of the train before the train enters the dormancy mode and the first device identification information received by the receiving antenna are stored in a non-volatile memory; after that, the train can be disconnected from the power supply to enter the dormancy mode, and, when it is woken up, second device identification information received by the receiving antenna after the train is woken up can be obtained, the first device identification information can be read from the non-volatile memory, and the first device identification information and the second device identification information are used to decide whether the train is in the position before it enters the dormancy mode after being woken up; if it is decided that the train is in the position before it enters the dormancy mode after being woken up, the positioning information stored in the non-volatile memory may continue to be used, thereby completing positioning of a train after being woken up. Since the train may be completely disconnected from the power supply and enter the dormancy mode, it is unnecessary to provide a large and heavy battery on the train while positioning of the train is performed after the train is woken up, and therefore the train weight will not be increased and the available space on the train will not be reduced, thus ensuring user experience.

Optionally, in Step 105 where the first device identification information and the second device identification information are used to decide whether the position of the train has changed, the two methods below may be used to decide whether the position of the train has changed before and after dormancy depending on different requirements on the safety level of a train:

Method 1: deciding whether the position of the train has changed before and after dormancy based on the device identification information received by the receiving antenna after the train is woken up;

Method 2: deciding whether the position of the train has changed before and after dormancy based on the device identification information received by the receiving antenna after the train is woken up and the receiving antenna that receives the device identification information.

The above two methods for deciding whether the position of the train has changed before and after dormancy are described below separately.

Figure 2:
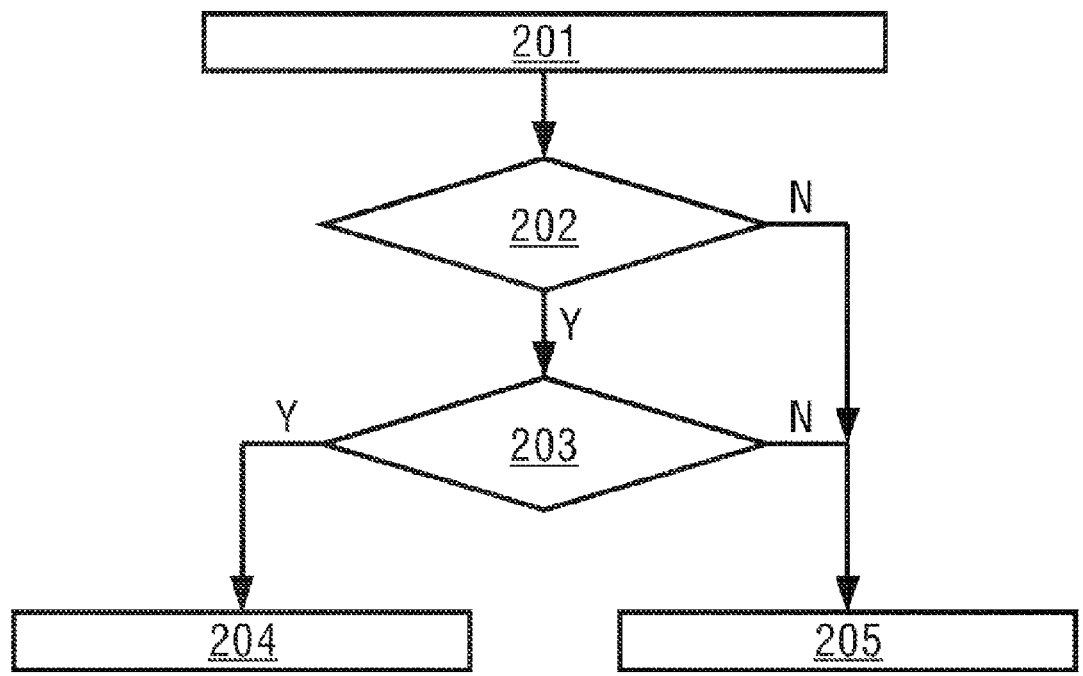
FIG. 2 is a flowchart of a method for checking a change in the train position after the train is woken up provided by one embodiment of the present invention.

For Method 1:

As shown in FIG. 2, the method for deciding whether the position of the train has changed before and after dormancy based on the device identification information may comprise the following steps:

Step 201: after the train is woken up, using each of the receiving antennas provided on the train to receive device identification information;

Step 202: deciding whether each receiving antenna has received device identification information; if Yes, performing Step 203, and if No, performing Step 205;

Step 203: deciding whether the device identification information received by each of the receiving antennas is identical with the first device identification information read from the non-volatile memory; if Yes, performing Step 204, and if No, performing Step 205;

Step 204: deciding that the position of the train has not changed before and after dormancy, and ending the current process;

Step 205: deciding that the position of the train has changed before and after dormancy.

In the embodiments of the present invention, after the train is woken up, an attempt is made to use a receiving antenna to receive device identification information from positioning devices. Since at least one receiving antenna can receive device identification information from positioning devices before the train enters the dormancy mode, if none of the receiving antennas receives device identification information after the train is woken up, it means that the train has left the dormancy area, and it is decided that the position of the train has changed before and after dormancy, i.e., the train is not in the position before it enters the dormancy mode after being woken up. If at least one receiving antenna receives device identification information after the train is woken up, it is further decided whether the device identification information received by the receiving antenna after the train is woken up is identical with the first device identification information stored in the non-volatile memory. If the device identification information received by each receiving antenna after the train is woken up is different from the first device identification information stored in the non-volatile memory, it means that the train moved in the dormancy area or entered another dormancy area, and thus it is decided that the position of the train has changed before and after dormancy. If the device identification information received by each receiving antenna after the train is woken up is identical with the first device identification information stored in the non-volatile memory, it means that the position of the train relative to the dormancy area has not changed, and thus it is decided that the position of the train has not changed before and after dormancy.

In the embodiments of the present invention, because different positioning devices send different device identification information, a plurality of pieces of first device identification information may be stored in the non-volatile memory. To decide whether the device identification information received by the receiving antenna after the train is woken up is identical with the first device identification information stored in the non-volatile memory is to decide whether the device identification information received by the receiving antenna after the train is woken up is identical with the first device identification information stored in the non-volatile memory in one-to-one correspondence.

In the embodiments of the present invention, because a positioning device can send device identification information to receiving antennas located within a limited communication range, if the position of the train has changed slightly, a receiving antenna will still receive the same device identification information. However, if the position of the train has changed significantly, the device identification information received by a receiving antenna will certainly change. Therefore, if a receiving antenna can receive the same device identification information before and after dormancy of the train, it means that the train is still in the dormancy area after being woken up, and positioning of the train is still possible when the safety level requirement is low. The efficiency of train positioning can be improved because it is only necessary to compare the device identification information received by a receiving antenna after a train is woken up with the first device identification information stored in a non-volatile memory to position the train after it is woken up.

Figure 3:
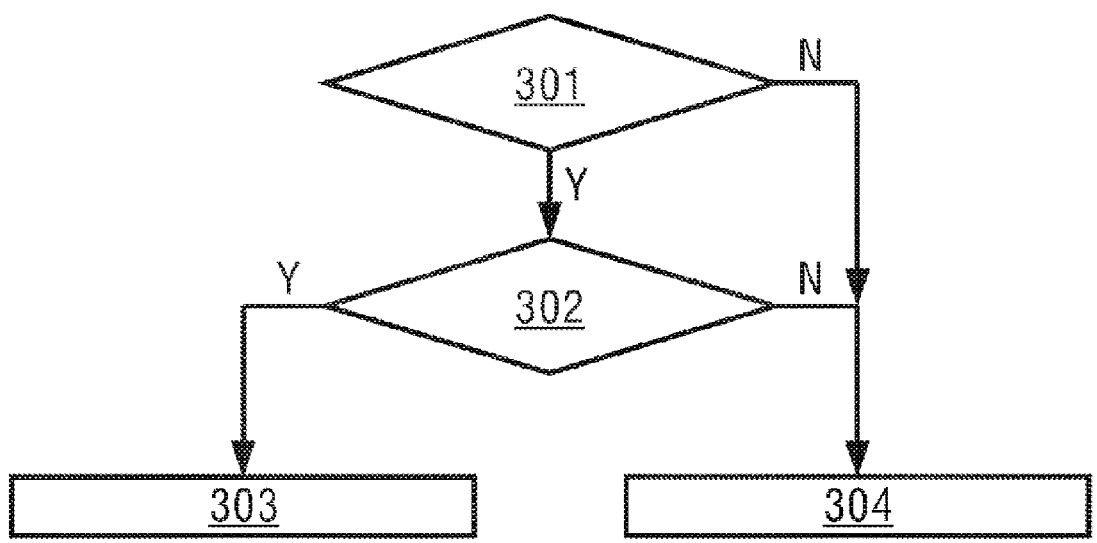
FIG. 3 is a flowchart of another method for checking a change in the train position after the train is woken up provided by one embodiment of the present invention.

For Method 2:

As shown in FIG. 3, the method for deciding whether the position of the train has changed before and after dormancy based on the device identification information and the receiving antenna may comprise the following steps:

Step 301: deciding whether there is at least one second receiving antenna that receives second device identification information; if Yes, performing Step 302, and if No, performing Step 304, wherein, the second receiving antenna is a receiving antenna that receives the identification information after the train is woken up from the dormancy mode, and the second device identification information is the device identification information received by the second receiving antenna;

Step 302: deciding whether each piece of the second device identification information is identical with each piece of the first device identification information, and deciding whether the identical second identification information and first device identification information are received by the same receiving antenna; if Yes, performing Step 303, and if No, performing Step 304;

Step 303: deciding that the train is in the position before it enters the dormancy mode after being woken up, and ending the current process;

Step 304: deciding that the train is not in the position before it enters the dormancy mode after being woken up.

In the embodiments of the present invention, after the train is woken up, an attempt is made to use a receiving antenna to receive device identification information from a positioning device. It is firstly decided whether a receiving antenna has received second device identification information that is identical with each piece of the first device identification information. If it is decided that each piece of the second device identification information received by the receiving antenna is identical with each piece of the first device identification information, it is further decided whether the identical first device identification information and second device identification information are received by the same receiving antenna. If it is decided that the identical first device identification information and second device identification information are received by the same receiving antenna, it is decided that the position of the train has not changed before and after dormancy, i.e., the train is in the position before it enters the dormancy mode after being woken up. If each piece of the second device identification information received by the receiving antenna is not identical with each piece of the first device identification information, or there are identical first identification information and second device identification information that are received by different receiving antennas, it is decided that the position of the train has changed before and after dormancy, i.e., the train is not in the position before it enters the dormancy mode after being woken up.

In the embodiments of the present invention, based on the decision that each piece of the second device identification information is identical with each piece of the first device identification information, it is further decided whether the identical first device identification information and second identification information are received by the same receiving antenna. Since a plurality of receiving antennas may be provided on a train and a plurality of positioning devices may be provided in a dormancy area, when the position of the train changes in the dormancy area, the device identification information received by a receiving antenna may be the same before and after the position of the train changes, but the same device identification information may be received by different receiving antennas. Therefore, by deciding whether identical first device identification information and second device identification information are received by the same receiving antenna, it is possible to decide whether the position of the train in the dormancy area has changed before and after dormancy, and thus it can be decided whether the train is in the same position after it is woken up and before it enters the dormancy mode more accurately, thereby ensuring the safety in continuing the use of the positioning information stored in the non-volatile memory after the train is woken up.

In the embodiments of the present invention, since a plurality of receiving antennas may be provided on a train and different receiving antennas may receive device identification information sent by the same positioning device, to decide whether identical first device identification information and second device identification information are received by the same receiving antenna, for any piece of first device identification information, if the first device identification information is received by at least two receiving antennas, the second device identification information identical with the first device identification information needs to be received by at least two receiving antennas, and the at least two receiving antennas that have received the second device identification information need to be the same as the at least two receiving antennas that have received the first device identification information, before it is decided that the first device identification information and the identical second device identification information are received by the same receiving antenna.

In the embodiments of the present invention, if it is decided that the train is in the position before it enters the dormancy mode after being woken up, it means that the position of the train and the direction of the train relative to the dormancy area are both the same after the train is woken up and before it enters the dormancy mode. After it is ensured that neither the position of the train nor the direction of the train relative to the dormancy area has changed, the positioning information stored in the non-volatile memory continues to be used as the positioning information after the train is woken up, thereby completing positioning of the train and ensuring the safety of implementing various FAO functions after the train is woken up.

Figure 4:
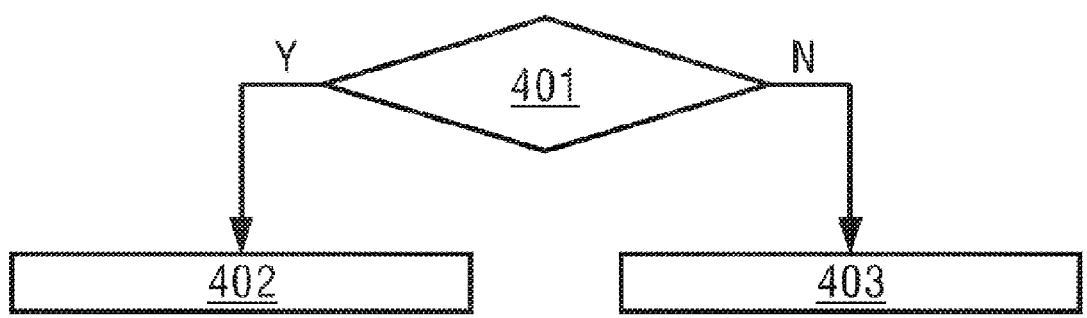
FIG. 4 is a flowchart of a method for managing information in a non-volatile memory provided by one embodiment of the present invention.

Optionally, based on the method for checking the position of a train after the train is woken up as shown in FIG. 3, after Step 304 where it is decided that the train is not in the position before it enters the dormancy mode after being woken up, each receiving antenna provided on the train may be checked for normal operation, and then the first device identification information and the positioning information stored in the non-volatile memory can be managed based on the checking result. As shown in FIG. 4, the method for managing the information in the non-volatile memory may comprise the following steps:

Step 401: checking whether each of the receiving antennas provided on the train is in normal operation; if Yes, performing Step 402, and if No, performing Step 403;

Step 402: deleting the first device identification information and the positioning information stored in the non-volatile memory, and ending the current process;

Step 403: keeping the first device identification information and the positioning information stored in the non-volatile memory.

In the embodiments of the present invention, after it is decided that the train is not in the position before it enters the dormancy mode after being woken up, each of the receiving antennas provided on the train is checked for normal operation. If all the antennas on the train are in normal operation in the check, it means that the position of the train has changed before and after dormancy, and the first device identification information and the positioning information stored in the non-volatile memory are meaningless and can be deleted. If at least one receiving antenna on the train is in abnormal operation in the check, the decision that the position of the train has changed before and after dormancy may be an erroneous decision due to the abnormal operation of the receiving antenna, and thus the first device identification information and the positioning information stored in the non-volatile memory may be kept and continue to be used for positioning of the train after the receiving antenna is repaired, to ensure the success rate of positioning of the train after it is woken up.

Figure 5:
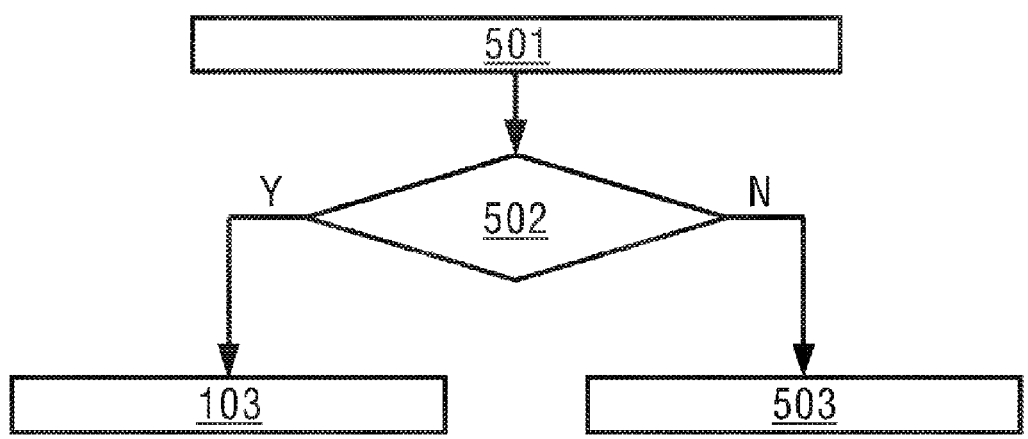
FIG. 5 is a flowchart of a method for determining the credibility of device identification information provided by one embodiment of the present invention.

Optionally, based on the train positioning method shown in FIG. 1B, before Step 103 where the first device identification information and the positioning information are stored in the non-volatile memory, it may be checked first whether the first device identification information is credible, and the first device identification information and the positioning information are stored in the non-volatile memory after it is confirmed that the first device identification information is credible. As shown in FIG. 5, the method for deciding whether the first device identification information is credible may comprise the following steps:

Step 501: determining the deployment position information of each of the positioning devices sending the first device identification information;

Step 502: deciding whether the first device identification information is credible based on the deployment position information and the positioning information; if Yes, performing Step 103, and if No, performing Step 503;

Step 503: sending alarm information.

In the embodiments of the present invention, after obtaining the first device identification information received by each of the first receiving antennas, deployment position information representing the configuration locations of the corresponding positioning devices can be determined based on the first device identification information, and the positioning information comprises position information indicating the position of the train, and then it can be decided whether each positioning device is located in the dormancy area where the train stops based on the deployment position information and the position information comprised in the positioning information. If it is decided that each positioning device that sends the first device identification information is located in the dormancy area where the train stops, it is decided that each piece of the first device identification information is credible; and if it is decided that at least one positioning device that sends the first device identification information is not located in the dormancy area where the train stops, it is decided that each piece of the first device identification information is not credible. After it is decided that the first device identification information is not credible, alarm information will be sent, to notify relevant personnel to take actions.

In the embodiments of the present invention, since different positioning devices will send different device positioning information, a positioning device that sends device positioning information can be determined based on one piece of device positioning information, and then the deployment position of the positioning device can be found on an electronic map. At the same time, according to the positioning information, the position of the train can also be found on the electronic map, and then the distance between the positioning device and the train can be determined, so as to decide whether the device identification information sent by the positioning device can be received by the receiving antennas provided on the train. If it is determined that the distance between a positioning device and the train is relatively far and has exceeded the effective communication range of the positioning device based on the first device identification information and the positioning information, it can be decided that the first device identification information sent by the positioning device is not credible, and then alarm information is sent.

In the embodiments of the present invention, before storing the first device identification information and the positioning information in the non-volatile memory, it is first decided whether the first device identification information is credible. Each piece of the first device identification information and the positioning information are stored in the non-volatile memory only when each piece of the first device identification is credible, thus ensuring the accuracy in determining the position of the train after it is woken up based on the first device identification information stored in the non-volatile memory, and further ensuring safety of the train.

Figure 6:
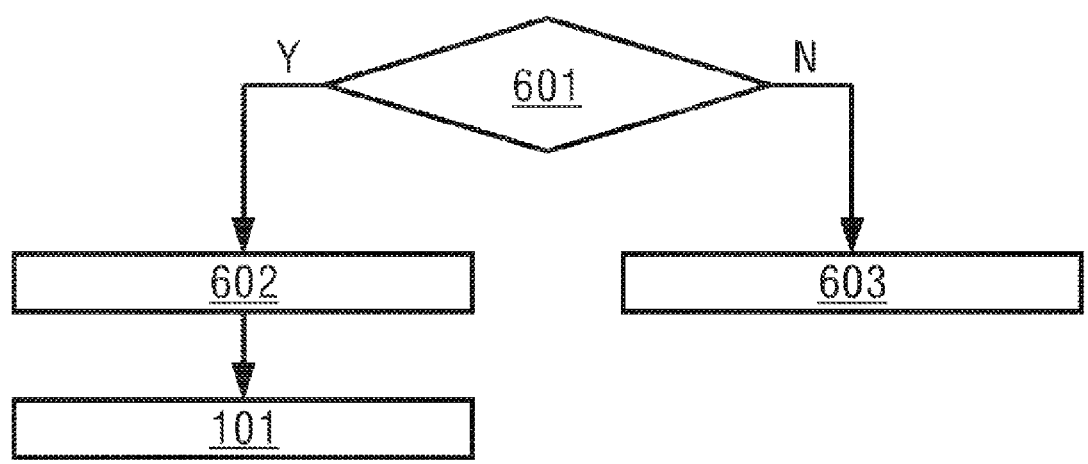
FIG. 6 is a flowchart of a method for deciding whether a train stops in position provided by one embodiment of the present invention.

Optionally, based on the train positioning method shown in FIG. 1B, before Step 101 where first device identification information received by at least one first receiving antenna is obtained, it can be decided whether the train has stopped accurately. As shown in FIG. 6, the method for deciding whether the train stops in position may comprise the following steps:

Step 601: deciding whether there is at least one third receiving antenna that receives device identification information sent by a positioning device matching it; if Yes, performing Step 602, and if No, performing Step 603, wherein, the at least one receiving antenna provided on the train comprises at least one third receiving antenna, the third receiving antenna has a matching positioning device, and can receive device identification information sent by the matching positioning device when the train reaches the target stop position in the dormancy area;

Step 602: deciding that the train has stopped in position, and performing Step 101;

Step 603: deciding that the train has not stopped in position.

In the embodiments of the present invention, at least one receiving antenna is provided on the train, and the receiving antennas provided on the train comprise at least one third receiving antenna that has a matching positioning device; when the train enters the dormancy area and reaches the target stop position, the third receiving antenna can receive device identification information sent by the matching positioning device. After the train enters the dormancy area, it can be checked whether each third receiving antenna provided on the train has received device identification information sent by the matching positioning device, so as to decide whether the train has reached the target stop position, thus ensuring that the train can accurately stop at the target stop position.

In the embodiments of the present invention, a third receiving antenna on the train may be fixed, or may change as the dormancy area changes. When a fixed third receiving antenna is provided on the train, when the train enters different dormancy areas, it is decided whether the train stops in position based on whether the third receiving antenna receives device identification information sent by the matching positioning device. When the third receiving antenna on the train changes, after the train enters a dormancy area, the third receiving antenna is selected from all the receiving antennas provided on the train based on the layout of the positioning devices in the dormancy area, and then it is decided whether the train stops in position based on whether the selected third receiving antenna receives device identification information sent by the matching positioning device.

It should be noted that, in the train positioning methods provided by each of the embodiments above, after it is decided that the current position and direction of the train match the positioning information stored in the non-volatile memory, and after it is confirmed that the train is successfully woken up, FAO of the train may start based on the positioning information stored in the non-volatile memory, and accordingly, after it is decided that the train is not in the position before it enters the dormancy mode after being woken up, it is confirmed that the train is not successfully woken up, and none of the various FAO functions can be implemented for the train.

In addition, it should be noted that the non-volatile memory may be provided on the train, as long as the stored information will not be lost after the train is disconnected from the power supply.

Figure 7:
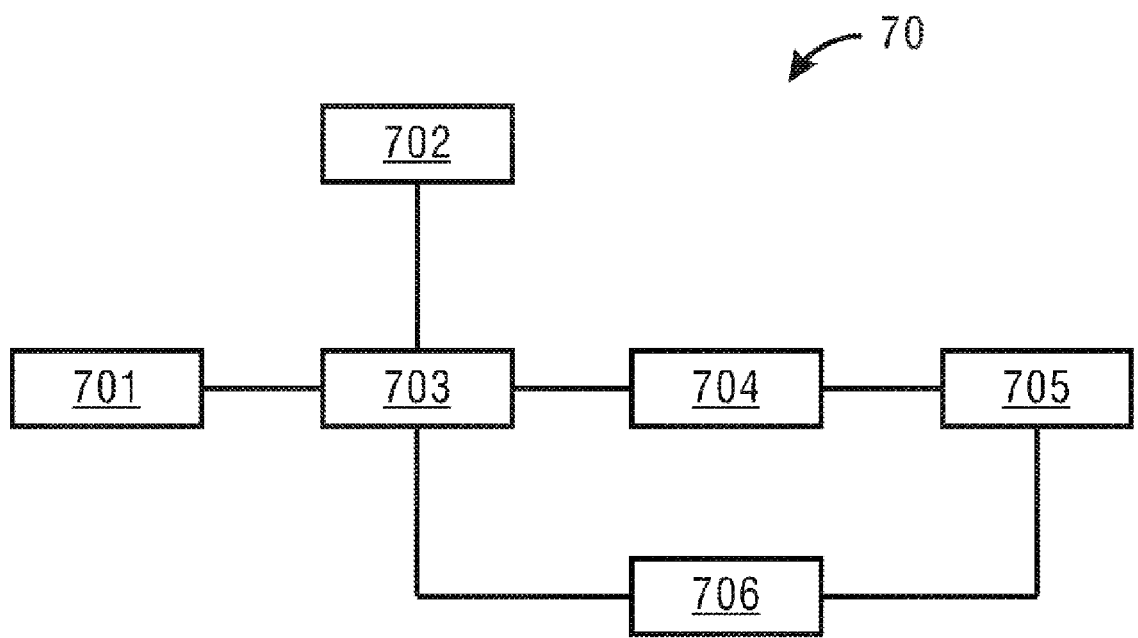
FIG. 7 is a schematic diagram of a train positioning apparatus provided by one embodiment of the present invention.

As shown in FIG. 7, the embodiments of the present invention provide a train positioning apparatus 70, comprising:
- a first information obtaining module 701, used to, after a train stops in a dormancy area, obtain first device identification information received by at least one first receiving antenna, wherein, at least one receiving antenna is provided on the train, at least one positioning device is provided in the dormancy area, the positioning device is used to send device identification information to the receiving antenna located within an effective communication range, different positioning devices send different device identification information, the first receiving antenna is a receiving antenna that receives the identification information before the train enters a dormancy mode, and the first device identification information is the device identification information received by the first receiving antenna;
- a second information obtaining module 702, used to obtain positioning information of the train, wherein, the positioning information comprises position information and direction information, the position information is used to indicate the position of the train, and the direction information is used to indicate the directions of two ends of the train relative to the dormancy area;
- an information storage module 703, used to, after deciding that the first device identification information obtained by the first information obtaining module 701 is credible, store the first device identification information and the positioning information obtained by the second information obtaining module 702 in a non-volatile memory, and put the train into a dormancy mode;
- a third information obtaining module 704, used to, after the train is woken up from the dormancy mode, use each of the receiving antennas to receive second device identification information;
- a movement deciding module 705, used to decide whether the train is in the position before it enters the dormancy mode after being woken up based on the second device identification information received by the third information obtaining module 704 and the first device identification information stored by the information storage module 703 in the non-volatile memory;
- a train positioning module 706, used to, when the movement deciding module 705 decides that the train is in the position before it enters the dormancy mode after being woken up, decide that the current position and direction of the train match the positioning information stored by the information storage module 703 in the non-volatile memory, and end positioning of the train.

In the embodiments of the present invention, the first information obtaining module 701 can be used to execute Step 101 in the above method embodiments, the second information obtaining module 702 can be used to execute Step 102 in the above method embodiments, the information storage module 703 can be used to execute Step 103 in the above method embodiments, the information reading module 704 can be used to execute Step 104 in the above method embodiments, the movement deciding module 705 can be used to execute Step 105 in the above method embodiments, and the train positioning module 706 can be used to execute Step 106 in the above method embodiments.

Figure 8:
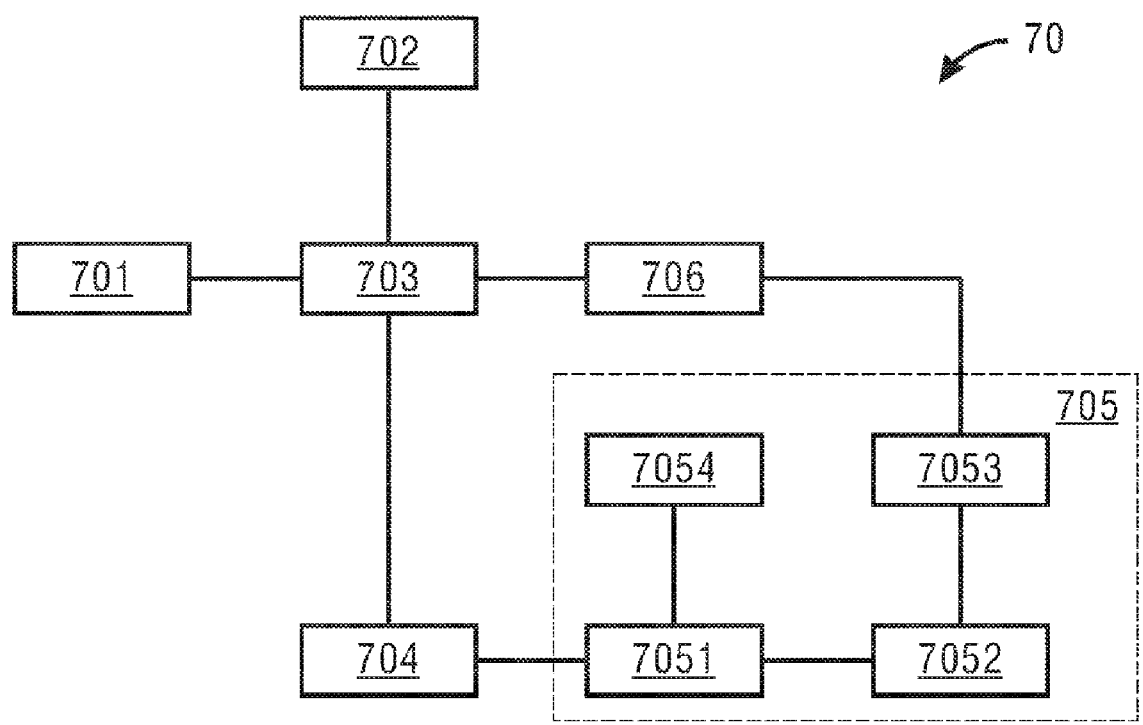
FIG. 8 is a schematic diagram of another train positioning apparatus provided by one embodiment of the present invention.

Optionally, based on the train positioning apparatus 70 as shown in FIG. 7, as shown in FIG. 8, the movement deciding module 705 comprises:
- a first deciding unit 7051, used to decide whether there is at least one second receiving antenna that receives second device identification information, wherein, the second receiving antenna is a receiving antenna that receives the identification information after the train is woken up from the dormancy mode, and the second device identification information is the device identification information received by the second receiving antenna;
- a second deciding unit 7052, used to, when the first deciding unit 7051 decides that there is at least one second receiving antenna that receives second device identification information, further decide whether each piece of the second device identification information is identical with each piece of the first device identification information, and decide whether the identical second identification information and first device identification information are received by the same receiving antenna;
- a first identification unit 7053, used to, when the second deciding unit 7052 decides that each piece of the second device identification information is identical with each piece of the first device identification information, and the identical second identification information and first device identification information are received by the same receiving antenna, decide that the train is in the position before it enters the dormancy mode after being woken up; and, when the second deciding unit 7052 decides that each piece of the second device identification information is not identical with each piece of the first device identification information, or at least one piece of the second identification information and the identical first device identification information are received by different receiving antennas, decide that the train is not in the position before it enters the dormancy mode after being woken up;
- a second identification unit 7054, used to, when the first deciding unit 7051 decides that there is no second receiving antenna that receives second device identification information, decide that the train is not in the position before it enters the dormancy mode after being woken up.

In the embodiments of the present invention, the first deciding unit 7051 can be used to execute Step 301 in the above method embodiments, the second deciding unit 7052 can be used to execute Step 302 in the above method embodiments, the first identification unit 7053 can be used to execute Step 303 and Step 304 in the above method embodiments, and the second identification unit 7054 can be used to execute Step 304 in the above method embodiments.

Figure 9:
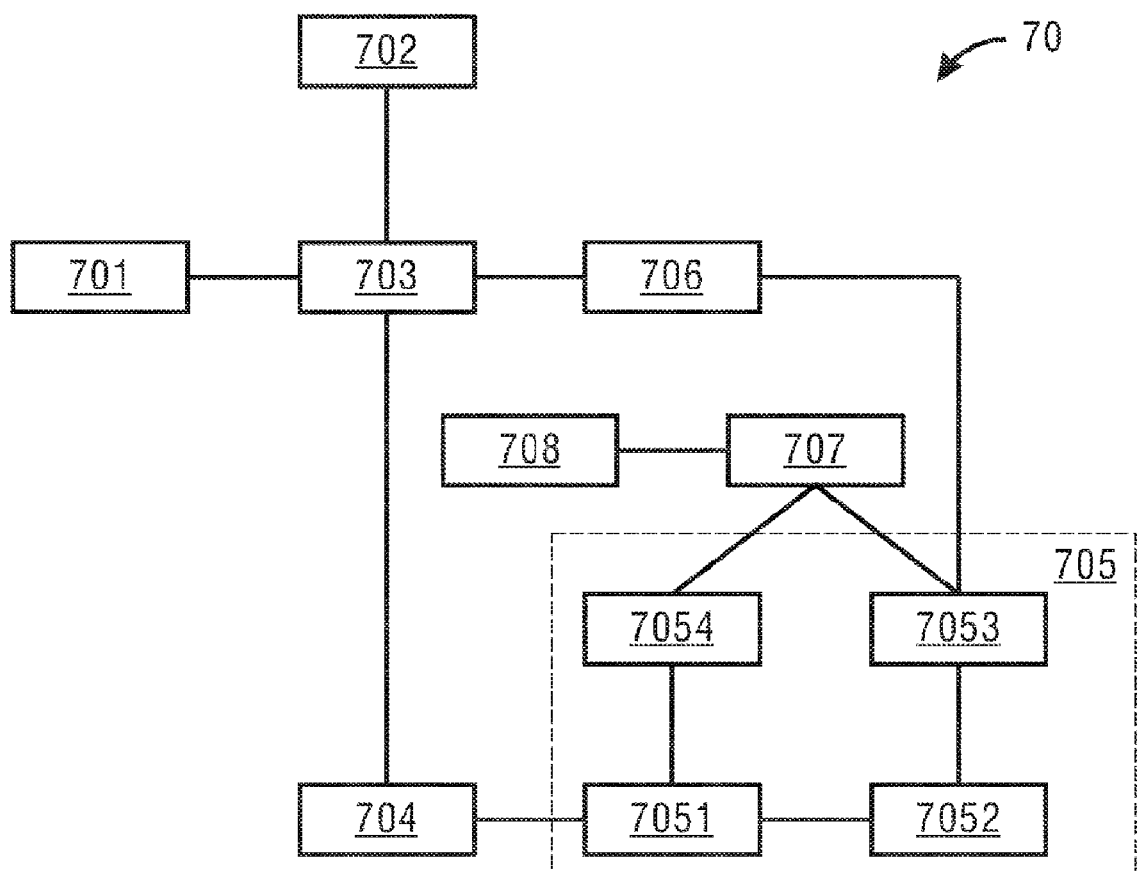
FIG. 9 is a schematic diagram of a train positioning apparatus comprising an antenna checking module provided by one embodiment of the present invention.

Optionally, based on the train positioning apparatus 70 as shown in FIG. 8, as shown in FIG. 9, the train positioning apparatus 70 further comprises:
- an antenna checking module 707, used to check whether each of the receiving antennas provided on the train is in normal operation when the first identification unit 7053 or the second identification unit 7054 decides that the train is not in the position before it enters the dormancy mode after being woken up;
- an information management module 708, used to, when the antenna checking module 707 decides that each of the receiving antennas provided on the train is in normal operation, delete the first device identification information and the positioning information stored in the non-volatile memory, and, when the antenna checking module 707 decides that at least one of the receiving antennas provided on the train is in abnormal operation, keep the first device identification information and the positioning information stored in the non-volatile memory.

In the embodiments of the present invention, the antenna checking module 707 can be used to execute Step 401 in the above method embodiments, and the information management module 708 can be used to execute Step 402 and Step 403 in the above method embodiments.

Figure 10:
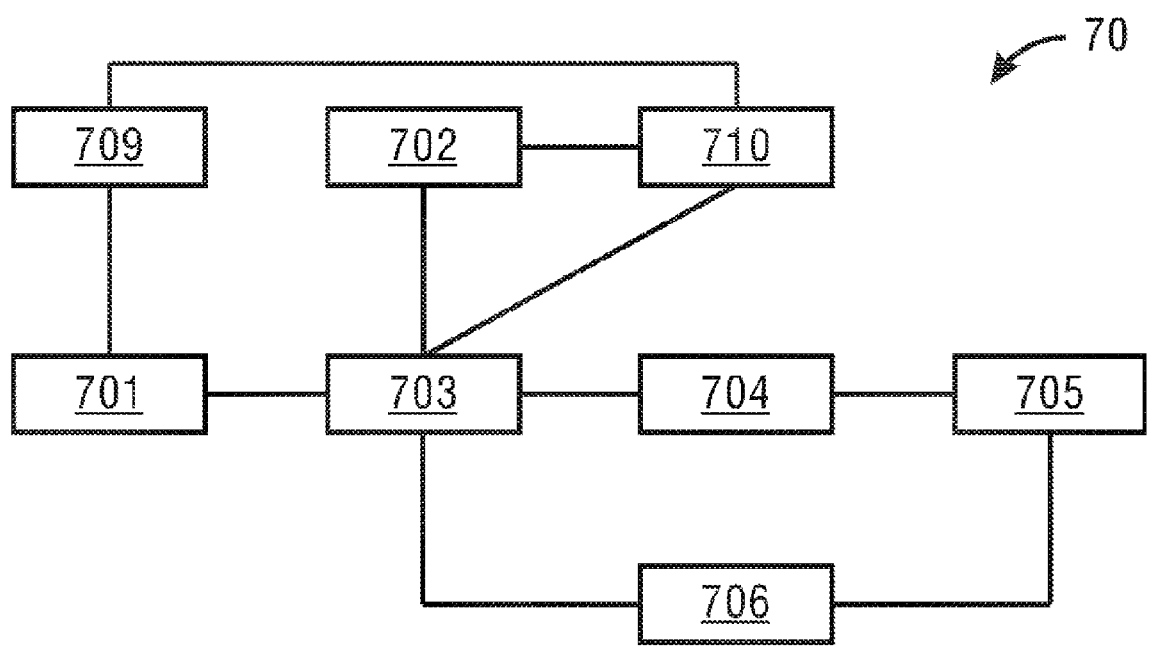
FIG. 10 is a schematic diagram of a train positioning apparatus comprising a position identification module provided by one embodiment of the present invention.

Optionally, based on the train positioning apparatus 70 as shown in FIG. 7, as shown in FIG. 10, the train positioning apparatus 70 further comprises:

a position identification module 709, used to determine the deployment position information of each of the positioning devices sending the first device identification information based on the first device identification information obtained by the first information obtaining module 701;

an information checking module 710, used to decide whether the first device identification information is credible based on the deployment position information determined by the position identification module 709 and the positioning information obtained by the second information obtaining module 702, trigger the information storage module 703 to perform the step of storing the first device identification and the positioning information in a non-volatile memory when it is decided that the first device identification information is credible, and send alarm information when it is decided that the first device identification information is not credible.

In the embodiments of the present invention, the position identification module 709 can be used to execute Step 501 in the above method embodiments, and the information checking module 710 can be used to execute Step 502 and Step 503 in the above method embodiments.

Figure 11:
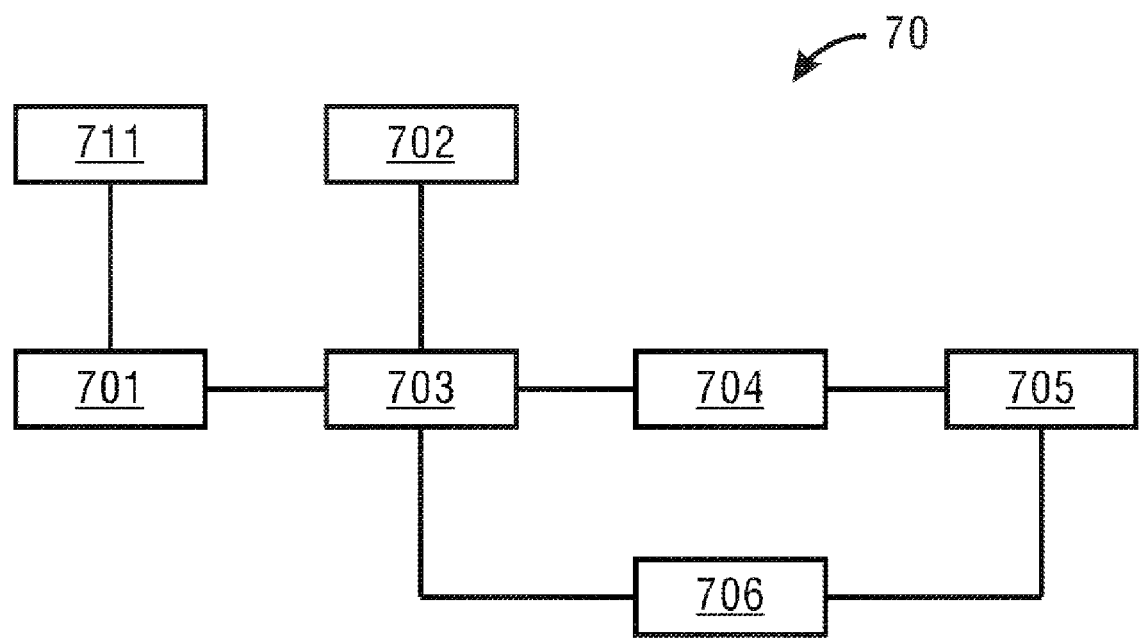
FIG. 11 is a schematic diagram of a train positioning apparatus comprising a train parking checking module provided by one embodiment of the present invention.

Optionally, based on the train positioning apparatus 70 as shown in FIG. 7, as shown in FIG. 11, the train positioning apparatus 70 further comprises:

a train parking checking module 711, used to decide whether there is at least one third receiving antenna that receives the device identification information sent by a positioning device matching it, wherein, the at least one receiving antenna provided on the train comprises at least one third receiving antenna, the third receiving antenna has a matching positioning device, when the train reaches a target stop position in the dormancy area, the third receiving antenna can receive the device identification information sent by the matching positioning device, decide that the train has stopped in position and trigger the first information obtaining module 701 to perform the step of obtaining first device identification information received by at least one first receiving antenna when it is decided that there is at least one third receiving antenna that receives the device identification information sent by the positioning device matching it, and decide that the train has not stopped in position when it is decided that there is no third receiving antenna that receives the device identification information sent by the positioning device matching it.

In the embodiments of the present invention, the train parking checking module 711 can be used to execute Step 601 to Step 603 in the above method embodiments.

Figure 12:
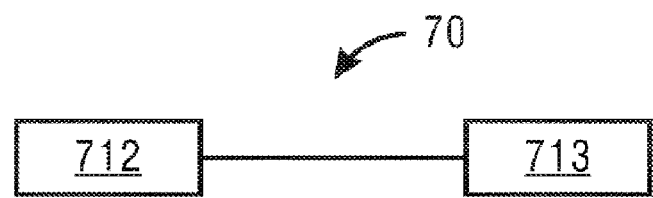
FIG. 12 is a schematic diagram of yet another train positioning apparatus provided by one embodiment of the present invention.

As shown in FIG. 12, one embodiment of the present invention provides a train positioning apparatus 70, comprising: at least one memory 712 and at least one processor 713;

the at least one memory 712 is used to store a machine-readable program; and the at least one processor 713 is used to call the machine-readable program to execute the train positioning method provided by each of the above embodiments.

The present invention also provides a computer-readable medium, which stores an instruction used to cause a computer to execute the train positioning method described herein. Specifically, a system or device equipped with a storage medium may be provided, and the software program code for implementing the functions of any of the above embodiments is stored on the storage medium, so that a computer (or CPU or MPU) of the system or device reads and executes the program code stored in the storage medium.

In this case, the program code itself read from the storage medium can implement the functions of any of the above embodiments, and so the program code and the storage medium storing the program code constitute part of the present invention.

Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer via a communication network.

In addition, it should be clear that, the operating system operating on a computer may be used to perform part or all of the actual operations and thus implement the functions of any of the above embodiments not only through executing a program code read by the computer but also through an instruction based on the program code.

It can be understood that it is possible to write the program code read from the storage medium to the memory provided in an expansion board inserted into the computer or to the memory provided in an expansion unit connected to the computer, and then the program code-based instructions cause the CPU, etc. mounted on the expansion board or the expansion unit to perform part or all of the actual operations, so as to implement the functions of any of the above embodiments.

It should be noted that not all steps and modules in the above processes and system structural diagrams are necessary, and some steps or modules may be ignored based on actual needs. The sequence of execution of the steps is not fixed, and can be adjusted as needed. The system structure described in the above embodiments may be a physical structure or a logical structure, i.e., some modules may be implemented by the same physical entity, or some modules may be implemented by multiple physical entities, or may be implemented by certain components in several independent devices working together.

In the above embodiments, the hardware units may be implemented mechanically or electrically. For example, a hardware unit may comprise a permanent dedicated circuit or logic (such as a dedicated processor, FPGA or ASIC) to complete the corresponding operation. The hardware unit may also comprise a programmable logic or circuit (such as a general-purpose processor or other programmable processors), which may be temporarily set by software to complete the corresponding operation. The specific implementation method (mechanical, or by a dedicated permanent circuit, or a temporarily set circuit) may be determined based on the cost and time considerations.

The present invention has been demonstrated and described in detail through the drawings and preferred embodiments above. However, the present invention is not limited to these disclosed embodiments. Based on the above embodiments, those skilled in the art can know that the code review methods in the different embodiments above may be combined to obtain more embodiments of the present invention, and these embodiments also fall within the scope of the present invention.

What is claimed is:

1. A train positioning method, comprising:
providing at least one first receiving antenna on a train, providing at least one positioning device in a dormancy area, obtaining first device identification information received by the at least one first receiving antenna after a train stops in the dormancy area, using the positioning device to send device identification information to the receiving antenna located within an effective communication range, using different positioning devices to send different device identification information, using the first receiving antenna to receive the identification information before the train enters a dormancy mode, and providing the first device identification information as device identification information received by the first receiving antenna;
obtaining positioning information of the train including position information and direction information, using the position information to indicate a position of the train, and using the direction information to indicate directions of two ends of the train relative to the dormancy area;
after determining the first device identification information to be credible, storing the first device identification information and the positioning information in a non-volatile memory, and putting the train into a dormancy mode;
after awakening the train from the dormancy mode, using the at least one receiving antenna to receive second device identification information;
deciding whether the train is in the position it occupied before entering the dormancy mode after being awakened, based on the received second device identification information and the first device identification information read from the non-volatile memory; and
upon deciding that the train is in the position it occupied before entering the dormancy mode after being awakened, deciding that a current position and direction of the train match the positioning information stored in the non-volatile memory, and ending positioning of the train.

2. The method according to claim 1, which further comprises deciding whether the train is in the position it occupied before entering the dormancy mode after being awakened based on the received second device identification information and the first device identification information read from the non-volatile memory by:
deciding whether there is at least one second receiving antenna receiving second device identification information, providing the second receiving antenna as a receiving antenna receiving the identification information after the train is awakened from the dormancy mode, and providing the second device identification information as the device identification information received by the second receiving antenna;
upon determining that there is at least one second receiving antenna receiving second device identification information, further deciding whether each piece of the second device identification information is identical with each piece of the first device identification information, and deciding whether the identical second identification information and first device identification information are received by the same receiving antenna;
upon determining that each piece of the second device identification information is identical with each piece of the first device identification information, and the identical second identification information and first device identification information are received by the same receiving antenna, deciding that the train is in the position it occupied before entering the dormancy mode after being awakened;
upon determining that each piece of the second device identification information is not identical with each piece of the first device identification information, or at least one piece of the second identification information and the identical first device identification information are received by different receiving antennas, deciding that the train is not in the position it occupied before entering the dormancy mode after being awakened; and
upon determining that there is no second receiving antenna that receives second device identification information, deciding that the train is not in the position it occupied before entering the dormancy mode after being awakened.

3. The method according to claim 2, which further comprises, after deciding that the train is not in the position it occupied before entering the dormancy mode after being awakened:
checking whether each of the receiving antennas provided on the train is in normal operation, and upon determining that each of the receiving antennas provided on the train is in normal operation, deleting the first device identification information and the positioning information stored in the non-volatile memory; and
upon determining that at least one receiving antenna of the receiving antennas provided on the train is in abnormal operation, keeping the first device identification information and the positioning information stored in the non-volatile memory.

4. The method according to claim 1, which further comprises, before storing the first device identification information and the positioning information in a non-volatile memory:
determining deployment position information of each of the positioning devices sending the first device identification information;
deciding whether the first device identification information is credible based on the deployment position information and the positioning information;
upon determining that the first device identification information is credible, storing the first device identification information and the positioning information in a non-volatile memory; and
upon determining that the first device identification information is not credible, sending alarm information.

5. The method according to claim 1, which further comprises, before obtaining first device identification information received by at least one first receiving antenna:
deciding whether there is at least one third receiving antenna receiving the device identification information sent by a matching positioning device, providing the at least one receiving antenna on the train with at least one third receiving antenna, providing the third receiving antenna with a matching positioning device, upon the train reaching a target stop position in the dormancy area, permitting the third receiving antenna to receive the device identification information sent by the matching positioning device;

upon determining that there is at least one third receiving antenna receiving the device identification information sent by the matching positioning device, deciding that the train has stopped in position, and obtaining first device identification information received by at least one first receiving antenna; and upon determining that there is no third receiving antenna receiving the device identification information sent by a matching positioning device, deciding that the train has not stopped in position.

6. A train positioning apparatus, comprising:
at least one memory and at least one processor;
said at least one memory configured to store a machine-readable program; and
said at least one processor configured to call the machine-readable program to execute the method according to claim 1.

7. A non-transitory computer-readable medium with instructions stored thereon, that when executed by a processor, perform the method according to claim 1.

8. A train positioning apparatus, comprising:
at least one first receiving antenna provided on a train, at least one positioning device provided in a dormancy area, a first information obtaining module configured to obtain first device identification information received by said at least one first receiving antenna after the train stops in the dormancy area, said at least one positioning device configured to send device identification information to said at least one receiving antenna located within an effective communication range, different positioning devices being configured to send different device identification information, said first receiving antenna receiving the identification information before the train enters a dormancy mode, and the first device identification information being received by said at least one first receiving antenna;

a second information obtaining module configured to obtain positioning information of the train, the positioning information including position information and direction information, the position information being used to indicate a position of the train, and the direction information being used to indicate directions of two ends of the train relative to the dormancy area;

an information storage module configured, after deciding that the first device identification information obtained by said first information obtaining module is credible, to store the first device identification information and the positioning information obtained by said second information obtaining module in a non-volatile memory, and to put the train into a dormancy mode;

a third information obtaining module configured, after the train is awakened from the dormancy mode, to use said at least one receiving antenna to receive second device identification information;

a movement deciding module configured to decide whether the train is in a position it occupied before entering the dormancy mode after being awakened based on the second device identification information received by said third information obtaining module and the first device identification information stored by said information storage module in said non-volatile memory; and a train positioning module configured, when the movement deciding module decides that the train is in the position it occupied before entering the dormancy mode after being awakened, to decide that the current position and direction of the train match the positioning information stored by said information storage module in said non-volatile memory, and end positioning of the train.

9. The train positioning apparatus according to claim 8, which further comprises providing said movement deciding module with:

a first deciding unit configured to decide whether there is at least one second receiving antenna receiving second device identification information, said second receiving antenna receiving the identification information after the train is awakened from the dormancy mode, and the second device identification information being received by said second receiving antenna;

a second deciding unit configured, upon said first deciding unit deciding that there is at least one second receiving antenna receiving the second device identification information, to further decide whether each piece of the second device identification information is identical with each piece of the first device identification information, and to decide whether the identical second identification information and first device identification information are received by the same receiving antenna;

a first identification unit configured, when the second deciding unit decides that each piece of the second device identification information is identical with each piece of the first device identification information, and the identical second identification information and first device identification information are received by the same receiving antenna, to decide that the train is in the position it occupied before entering the dormancy mode after being awakened; and, when the second deciding unit decides that each piece of the second device identification information is not identical with each piece of the first device identification information, or at least one piece of the second identification information and the identical first device identification information are received by different receiving antennas, to decide that the train is not in the position it occupied before entering the dormancy mode after being awakened; and a second identification unit configured, when said first deciding unit decides that there is no second receiving antenna receiving the second device identification information, to decide that the train is not in the position it occupied before entering the dormancy mode after being awakened.

10. The train positioning apparatus according to claim 9, which further comprises:

an antenna checking module configured to check whether each of the receiving antennas provided on the train is in normal operation when said first identification unit or said second identification unit decides that the train is not in the position it occupied before entering the dormancy mode after being awakened; and an information management module configured, when said antenna checking module decides that each of said receiving antennas provided on the train is in normal operation, to delete the first device identification information and the positioning information stored in said non-volatile memory and, when said antenna checking module decides that at least one receiving antenna of said receiving antennas provided on the train is in abnormal operation, to keep the first device identification information and the positioning information stored in said non-volatile memory.

11. The train positioning apparatus according to claim 8, which further comprises:
a position identification module configured to determine deployment position information of each of said positioning devices sending the first device identification information based on the first device identification information obtained by said first information obtaining module; and
an information checking module configured to decide whether the first device identification information is credible based on the deployment position information determined by said position identification module and the positioning information obtained by said second information obtaining module, to trigger said information storage module to store the first device identification and the positioning information in a non-volatile memory when it is decided that the first device identification information is credible, and to send alarm information when it is decided that the first device identification information is not credible.

12. The train positioning apparatus according to claim 8, which further comprises:
a train parking checking module configured to decide whether there is at least one third receiving antenna receiving the device identification information sent by a matching positioning device, said at least one receiving antenna provided on the train including at least one third receiving antenna, said at least one third receiving antenna having a matching positioning device, upon the train reaching a target stop position in the dormancy area, said at least one third receiving antenna being permitted to receive the device identification information sent by said matching positioning device, to decide that the train has stopped in position and to trigger said first information obtaining module to obtain first device identification information received by said at least one first receiving antenna when it is decided that there is at least one third receiving antenna receiving the device identification information sent by said matching positioning device, and to decide that the train has not stopped in a position when it is decided that there is no third receiving antenna receiving the device identification information sent by a matching positioning device.

13. A train positioning system, comprising:
at least one receiving antenna, at least one positioning device and a train positioning apparatus according to claim 8;
said at least one receiving antenna being provided on a train;
said at least one positioning device being provided in a dormancy area;
said at least one positioning device configured to send device identification information to said at least one receiving antenna located within an effective communication range, and different positioning devices configured to send different device identification information; and
said at least one receiving antenna configured to receive the device identification information from said at least one positioning device, and to send the device identification information to said train positioning apparatus.

14. The system according to claim 13, wherein said at least one receiving antenna includes at least two receiving antennas provided on the train along a running direction of the train.

15. The system according to claim 13, wherein said at least one positioning device includes at least two positioning devices provided in the dormancy area along a track direction of the dormancy area.

* * * * *